July 21, 1970 J. C. NEEDHAM ET AL 3,521,027

CONTROLLED ARC WELDING

Filed March 27, 1967 3 Sheets-Sheet 1

Inventors
James C. Needham
Edward C Partington
By Kemon, Palmer,
Stewart & Estabrook
Attorneys

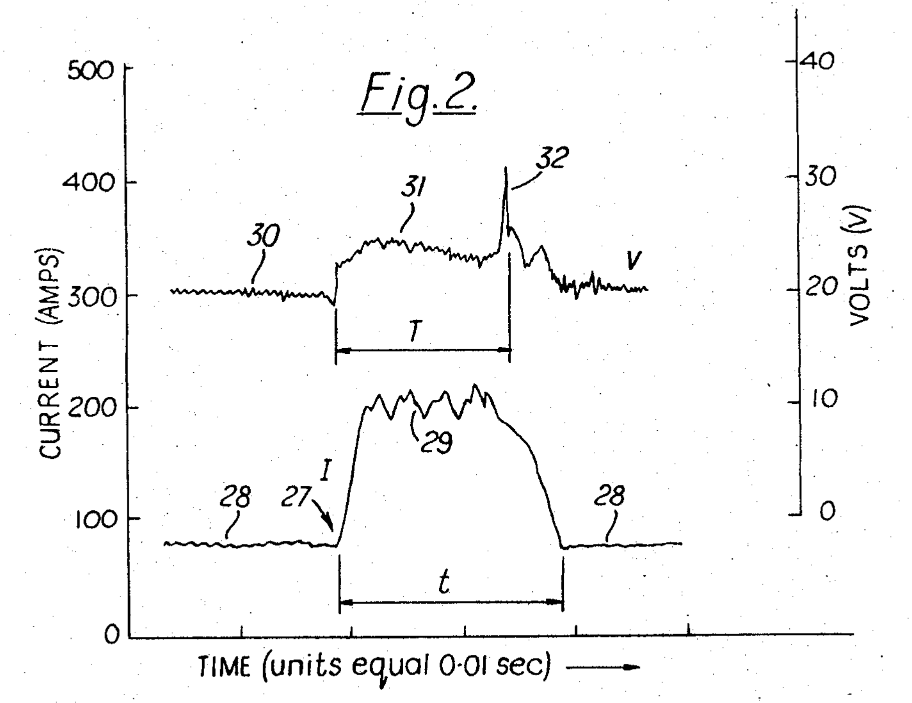
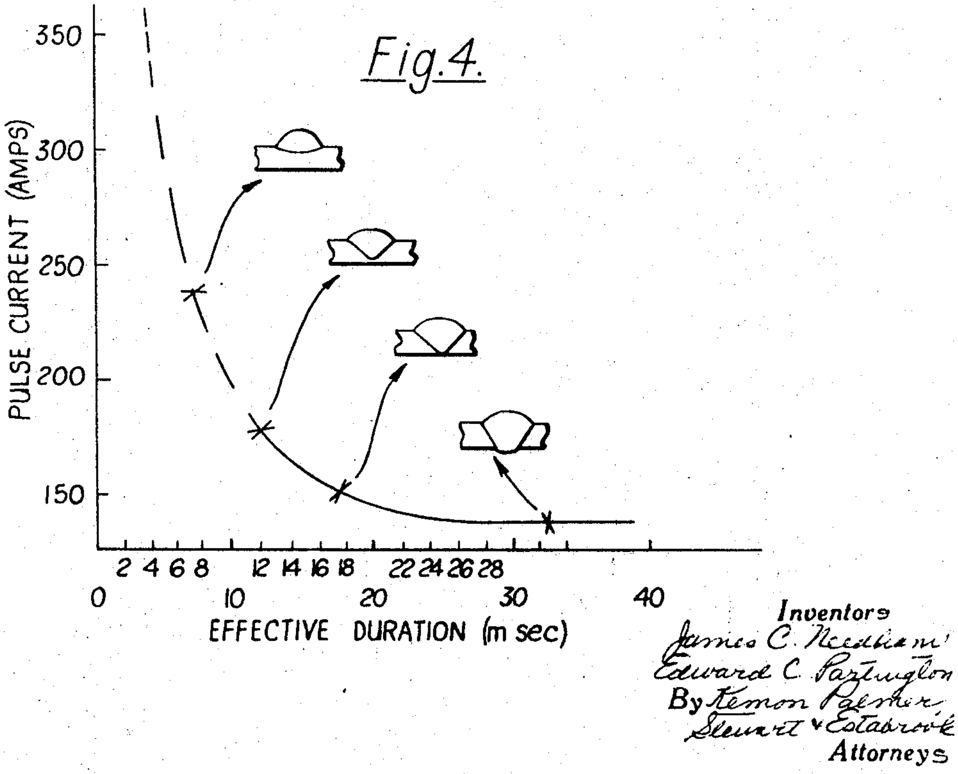
Inventors
James C. Needham
Edward C. Partington
By Kemon Palmer
Stewart & Estabrook
Attorneys Inventors
James C. Needham
Edward C. Partington
By Kemon, Palmer, Stewart & Estabrook
Attorneys United States Patent Office 3,521,027

Patented July 21, 1970

1

3,521,027

CONTROLLED ARC WELDING

James C. Needham and Edward C. Partington, Abington Hall, Cambridge, England, assignors to The Welding Institute, a body corporate of Great Britain Filed Mar. 27, 1967, Ser. No. 626,106
Claims priority, application Great Britain, Mar. 29, 1966, 13,903/66
Int. Cl. B23k *9/10*
U.S. Cl. 219—131 6 Claims

ABSTRACT OF THE DISCLOSURE

A spray transfer welding system is disclosed in which a consumable electrode carries pulses superimposed on background current. Pulse amplitude and duration are adjusted together to obtain different degrees of penetration of the workpiece.

This invention relates to consumable electrode welding employing pulsed current sources and more particularly to apparatus for altering the characteristics of the current source to provide improved control of the transfer of electrode material.

Controlled transfer arc welding is known in which the electrode is supplied with current which is raised cyclically at preset intervals from a background level (which is sufficient to melt the electrode tip but not to produce transfer of the electrode in the periods for which it is effective) to a higher level which produces transfer. A convenient source of power for such controlled transfer supplies a D.C. or rectified and partly smoothed A.C. background level superimposed with pulses of half sinusoidal waveform at the frequency of the mains supply.

Explanations of the detachment of the droplets from the consumable electrode and their projection towards the workpiece have been based on the balance of forces between that due to the arc and the gravity force, on the one hand, and the retainment forces due to surface tension on the other hand. The force due to the arc may be due to the "pinch effect" caused by the reaction of the transverse component of current flow with the circular magnetic field surrounding the consumable electrode carrying the current, which would tend to move the central portion of the droplet away from the end of the electrode on which it is formed.

We believe that although this "static balance" explanation may hold for sub-threshold transfer, that is to say for transfer of large globules which fall infrequently mainly under gravitational forces, the explanation based on a static balance of forces is inadequate to explain detachment above the threshold current valve, where true spray transfer is taking place. We believe that in spray transfer the balance of forces to be considered is dynamic in nature and that it is necessary to take into account the force available to accelerate the droplet until its displacement is such that detachment occurs. This view is supported by certain experimental results linking pulse current level, the effective duration of the pulse (that is to say, the interval from the start of the pulse to the instant that transfer detachment takes place) and the mass of the droplets of transferred material. For example, we have found that for a given electrode material, wire size and shielding gas combination, if the amplitude I of the current pulses is above the minimum current necessary to induce nongravitational electrode transfer the relationship between the amplitude I of the current pulses and the effective duration T (as defined above) of the pulses is expressed approximately by the equation:

$$I^n = B/T$$

2 in which B is a coefficient depending on the materials and the size of the drop to be detached and in which the index $n$ normally lies between 1.5 and 2.5. All increase in the size of the droplets, which for a given feed speed of the consumable electrode wire is obtained by decreasing the pulse repeat frequency, is found to require an increase in pulse magnitude or in the effective pulse duration or both, in order to maintain the spray transfer. This result, which we have verified with pulse currents of substantially square waveform to obtain more reliable results in terms of effective magnitude and duration, is contrary to expectations based on a consideration of the static balance. On the basis of a static balance, it would be assumed that at any one pulse current level the conditions and forces acting in the arc would be to some approximation constant and that therefore the detachment of larger drops aided by gravitational forces would have occurred more readily. On the other hand, the increase in pulse magnitude or effective pulse duration for increasing mass of the droplet would not conflict with an explanation which included the force necessary to accelerate the mass of the droplet until detachment occurred, since the inertia of the droplet to be accelerated would act in a sense opposite to its gravitational weight term and would outweight the latter in the dynamic balance for accelerations greater than that due to the gravitational force. A further factor supporting this theory is that if the mass of the droplets is allowed to increase, by decreasing the pulse repeat frequency or increasing the electrode feed speed, and the current is adjusted to maintain a fixed effective pulse duration, it is the increase in the square of the current amplitude which varies substantially in proportion to the increase in droplet mass. Also, for a given droplet mass with a given combination of electrode wire and shielding gas atmosphere, the magnitude of the pulse current required for droplet detachment decreases as the time available for detachment is increased. For short detachment times for example, less than 5 milliseconds, high currents are necessary, while for currents not much in excess of the minimum value for non-gravitational transfer the accelerations are low and the detachment times are long, and increase rapidly as this maximum current level is approached.

The realisation of the power law relationship between current and duration brings with it a number of advantages. Pulse welding systems generally operate with pulse current derived by rectifying the output of an A.C. source. With such arrangements, each pulse has a maximum duration of one half cycle of the A.C. waveform, which is about ten milliseconds in the case of a 50 c.p.s. supply. In practice, the duration of the pulse is little more than six milliseconds because no current flows until the voltage available exceeds that of the arc. Because of the relatively slow rise and fall times of the pulse due to the sinusoidal waveshape of the supply, the current is greater than a level midway between background current and peak pulse current for no more than 5 milliseconds. It happens that the value of five milliseconds occurs at a point on the power law curve linking current amplitude and duration at which increases in duration result in noticeable decreases (due to the power law relationship) in the current amplitude required to achieve pulse-induced spray transfer. Since the current flowing is generally of a comparatively high order, a reduction on this power law basis is highly advantageous in reducing the demand on the pulse supply equipment. A further advantage is derived from the further discovery that variations of the pulse duration away from that normally used causes a change in the penetration by the transferred droplets into the workpiece. Somewhat surprisingly, high amplitude pulses having correspondingly short effective durations result in considerably less penetration of the workpiece than lower amplitude pulses having correspondingly longer effective durations. This is of great advantage in practice since heretofore it has not been possible to alter by any great extent the penetration associated with any particular mean current level or electrode burn-off rate. As examples, in normal welding operations, deep penetration providing improved wetting of the weld pool deep into the workpiece is desirable, whilst in surfacing and other applications low penetration can be utilised. Typical pulse durations for providing deep penetration for the droplets of the order of twice the wire diameter, for aluminium wire of 1/16 inch diameter, are in the range of 15 to 30 milliseconds. These values are considerably in excess of those used when the pulses were provided by half cycles of the power supply.

To permit these advantages to be obtained, according to the present invention, pulsed arc welding apparatus includes adjustable means for varying the amplitude of the pulsed current over a predetermined range and adjustable means for varying the pulse duration of the pulsed current over a predetermined range. This permits the lengthening of the current pulse to enable deeper penetration with a decrease, based on the power law relationship, in the current amplitude required. By such adjustment of amplitude and duration, it can be ensured that the pulse duration does not extend greatly beyond the detachment instant, which would have the additional disadvantage that the continued current at the pulse level would cause too much melting of the consumable electrode and would thus limit the lowest feed speed which could be used.

In the preferred form of apparatus embodying the invention, the means for varying the amplitude and the means for varying the duraiton of the pulse are so coupled that variations of amplitude and duration are linked, for a given material and required drop size, by the relationship:

$$I^n = B/t$$

in which $t$ is the duration of the current pulses from the power supply. As stated above, index $n$ may advantageously lie between 1.5 and 2.5 and it may be made equal to 2 for some combinations of electrode material, shielding gas, wire feed speed and required droplet size.

To obtain more precise control of duration and to ensure that the pulse is at its most effective for the whole of the pulse duration, we prefer to use pulses of substantially square waveform. Such pulses can be obtained by the use of a three phase supply with controlled rectifiers to gate groups of successive pulses from the various phases. Thus in the case of a 50 c.p.s. supply, the pulse duration would increase in steps of 1/300 of a second.

In order that the invention may be better understood, one example will now be described with reference to the accompanying drawing, in which:

FIG. 2 is a diagram illustrating the meaning of terms used in the description;

FIG. 4 is a graph showing the relationship between the current amplitude and duration of the pulse and the penetration achieved at various points on the curve.

Figure 1:
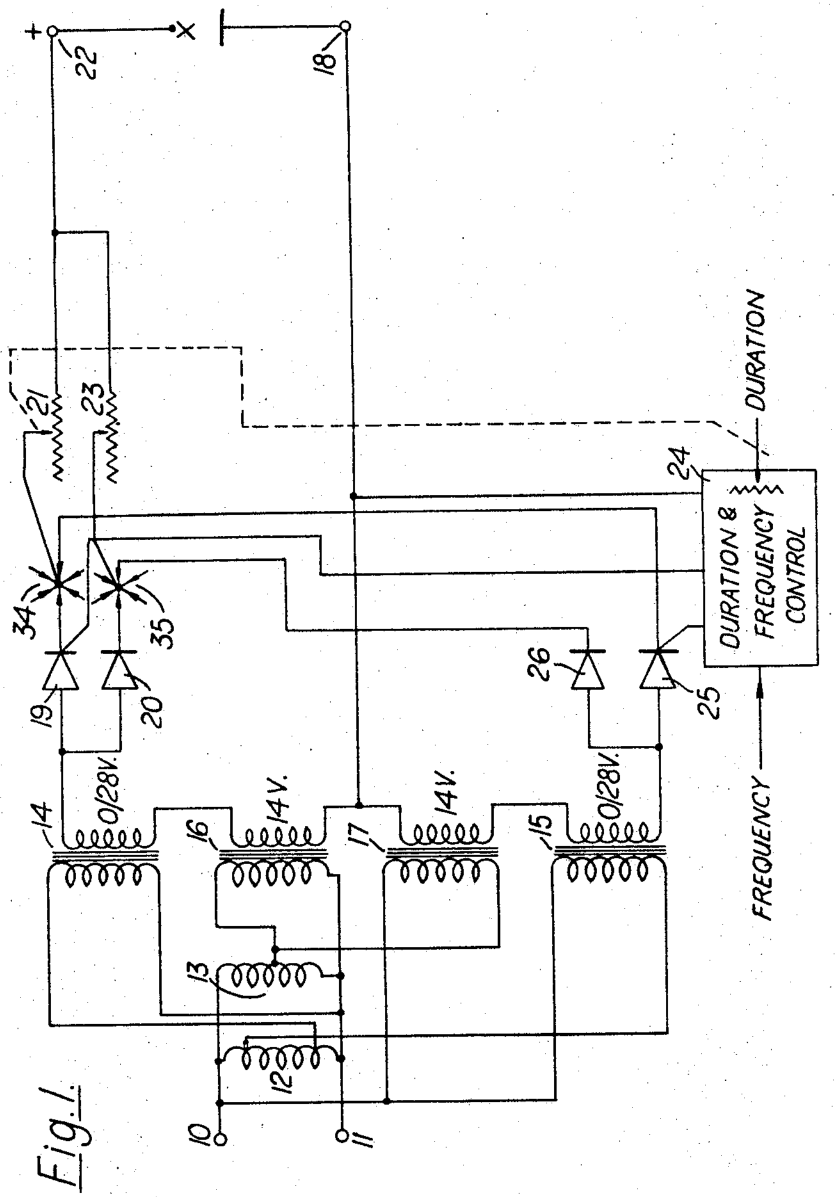
FIG. 1 shows the basic circuit for one phase of a three phase source, this being repeated identically for the other two phases of the source.

In FIG. 1, the line and neutral connections 10 and 11 are connected across the winding 12 of a double variable auto-transformer and the winding 13 of a further auto-transformer which give fine and coarse control respectively. From the winding 12, a first voltage is tapped for application to the primary of a transformer 14 and a second voltage is derived for the primary of a transformer 15. The winding 13 has a single tapping and the primary windings of transformers 16 and 17 can be connected across opposite halves of this winding (as shown) or can each be connected across the whole of the winding 13. The secondary windings of these transformers are connected in series, the secondary windings of transformers 16 and 17 providing 14 volts each and those of transformers 14 and 15 providing a secondary voltage which can be varied between 0 and 28 volts. A centre tapping of the series-connected secondary winding is taken to the output terminal 18. One end connection of these secondary windings is connected in parallel to the anode of a silicon controller rectifier 19 and the anode of a diode 20. The silicon controlled rectifier 19 is connected through a rheostat 21 to the output terminal 22, to which the diode 20 is also connected through a rheostat 23.

Conduction in the diode 20 will occur during peak parts of alternate half waves across the transformer secondaries. Conduction in the silicon controlled rectifier 19 depends on whether a gating pulse has been applied to the gate electrode of this controlled rectifier from a duration and frequency control unit 24.

The other end of the series-connected secondary windings is similarly connected to the anodes of a silicon controlled rectifier 25 and diode 26, the cathodes of these components being connected to the same output terminal 22 through the same rheostats 23 and 21 respectively. The same duration and frequency control unit 24 generates gating pulses for application to the gate electrode of silicon controlled rectifier 25.

The diode 26, together with the rectifier 25 if it has received a suitable gating signal, conducts during the half cycle in which the diode 20 and the rectifier 19 are non-conducting. The current passing through the diodes 20 and 26 and the corresponding diodes in the other two phases provides the background current and the current passing through the controlled rectifiers 19 and 25 and those in the other two phases supplies the current pulse. The rectifier cathodes in the other phases are connected to the pulse and background circuits at points 34 and 35 respectively. The background and pulse currents are adjusted by means of the rheostats 23 and 21. Because there are three phases in the complete power supply, the output current has a 300 c./s. ripple.

In order that the waveform of each pulse should be identical in successive cycles, the repeat frequencies of the gating waveforms are preferably chosen in simple relation to the main supply. For example, repeat frequencies of 50, 25, 16⅔, 12½, 8⅓ and 6¼ pulses per second may conveniently be derived. For any given pulse repeat frequency the pulse length can be extended to about 75% of the overall pulse cycle period, when deep penetration is required.

Turning now to FIG. 2, the waveform 27 shows the current trace during a welding operation using aluminium electrode wire with argon as the shielding gas, the portions 28 representing the background level and the portion 29 the pulse level, the pulse having a duration equal to $t$. The waveform 30 shows the arc voltage trace over the same period. It will be seen that the arc voltage increases from a first level 30 which exists prior to the commencement of the current pulse to a higher level 31 once the pulses have been initiated. The upward spike 32 is the point of detachment of the droplet and defines the end of the effective duration T.

With the circuit shown in FIG. 1, the pulse output commences at a point where a given phase and rectifier is about to conduct and is maintained for as many subsequent conducting periods on successive phases as are required. As an example, if the phase circuits giving successive peaks of either polarity are indicated by A, B, C, D, E and F, the pulse may be initiated by applying a gating pulse to the silicon controlled rectifier in the circuit A and continued by applying gating pulses to the silicon controlled rectifiers in the circuits B and C. Assuming that the gating pulses then stop, the pulse will have lasted for about 13 milliseconds, on a 50 c.p.s. supply.

If the pulse is to be extended further, gating pulses are applied to the silicon controled rectifiers in circuits D, E and F. In the resulting overall pulse, the rise and fall times are small compared with the total length of the pulse.

Figure 3:
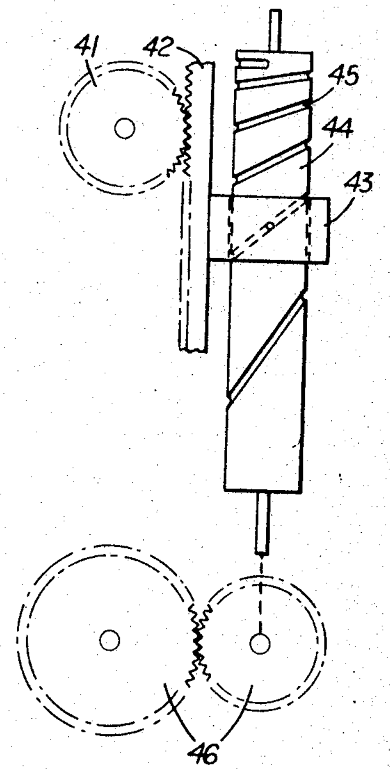
FIG. 3 illustrates a mechanical coupling between the amplitude and duration controls.

FIG. 3 shows a simple form of mechanical linkage for coupling the wiper of rheostat 23 with a potentiometer in the unit 24 controlling the duration of the gating signals for the silicon controlled rectifiers. This linkage includes a pinion 41 mechanically coupled to the wiper of the potentiometer in the unit 24, and a rack 42 engaging with the pinion and connected to a follower sleeve 43 surrounding a logarithmic worm 44, that is to say a cylinder having in its circumferential surface a groove 45 shaped to produce the required logarithmic relationship between the rotation of the worm about its axis and the linear movement of a follower engaging in the groove. This follower is formed within the sleeve 43. The worm is driven in rotation by gears 46 in synchronism with the adjustment of current amplitude.

It is not necessary for the groove to follow an exact mathematical relationship. The groove shape may be derived by marking the cylinder at various points where different pairs of values for the pulse duration and pulse amplitude are together just sufficient to ensure control of transfer, the groove then being formed along a line joining the marks.

Alternatively a simple face cam is used instead of the non-linear groove. Thus a cam attached to or operated by the output or current on the power source actuates via a cam follower the control affecting the pulse duration. Again the cam profile can be part of a mathematical function, or derived by choice of satisfactory pairs of current and time control settings.

In a self-adjusting arc system where the current drawn is largely determined by the electrode feed and the operating arc length, it is preferable to make the pulse duration relate to the current flowing rather than a power source setting. Thus a self balancing servo is used to set a cam or worm in accordance with the operating pulse current magnitude which in turn adjusts the control for pulse duration as desired. The mechanical linkage serving for the power law relationship can be replaced by a nonlinear electrical network in a system in which the pulse duration is made dependent on the pulse current amplitude.

Where a controlled arc with an electrode feed governed in accordance with the arc voltage is used the power supply is of the constant current rather than the constant voltage type. In this case the current is largely controlled by the power source settings and hence a linkage based on the control settings can be used to govern the desired pulse duration in order to maintain the relationship between pulse current and duration so that the one parameter decreases with increase in the other.

FIG. 4 is a graph showing the relationship between current amplitude and pulse duration. It will be seen that lengthening the pulse from the conventional value of about 5 milliseconds to 10 or 20 milliseconds enables a considerable reduction in current amplitude. On this diagram there are shown some illustrations of the penetration achieved for different durations, showing that beyond the range normally used the penetration achieved by the detached droplet increases strongly with pulse duration.

The use of the same transformer source to provide the background current and the pulse current has the advantage that both currents have the same open circuit voltage and there is no tendency for the pulse current to interfere with the background current. The problem of transition between the current pulse and background level is thus eliminated. If desired however the background and pulse currents may be derived from separate sources. A smoothing choke is then preferably provided to overcome the effects of the pulse current on the background current at large pulse current amplitudes.

The power source shown, using silicon controlled rectifiers, permits pulses of substantially square waveform to be obtained. If desired, a 3-phase bridge can be used, in which one half of the rectifiers are of the controlled kind. Preferably, the supply is such that the pulse current amplitude can be varied over the range from 100 to 600 amps and the duration can be varied over the range of 10 to 50 milliseconds; for surfacing, it may be desirable to reduce the duration to as little as 3 milliseconds. As indicated above, the unit 24 also enables the repeat frequency of the pulse to be varied and thus permits the droplet size to be varied.

The degree of output slope of the supply is controlled by the rheostat 21, for the pulse current. For a high degree of self adjustment, the source supplying the arc should have as flat an output characteristic as possible but for consistent pulse current amplitudes it is preferable to limit the degree of self adjustment so that minor variations in arc voltage do not cause appreciable changes in the pulse current. In general, an output slope between 2 v./100 a. and 5 v./100 a. is found to be convenient, as this gives adequate short term stability and long term self-adjustment.

It may be found that if the output characteristic of the background source droops steeply and the pulse current is low, the total available short circuit current is insufficient to fuse the cold electrode wire rapidly for the initiation of an arc at the start of a run, especially for low pulse repetition frequencies. To overcome this difficulty, an additional power source can be added in parallel to supply the short circuit starting current.

The power source shown can be replaced by a semiconductor power supply circuit comprising a number of individual semi-conductor circuits in parallel, for example 50 circuits each capable of handling 30 amps of short-circuit current from a source having an open circuit voltage of 40 volts. As an example, ADY 26 transistors (manufactured by Mullard Ltd., of London) can be employed. The operating conditions for these transistors should be such that they are fully on or fully off, to maintain the power dissipation at a low value. Each transistor has its emitter-collector path connected in the power supply circuit with sufficient resistance to limit the current for any individual transistor and to balance the overall current sharing between transistors with the group. The transistors are switched on by the application of simultaneous gating signals to their bases.

We claim:

1. Arc welding apparatus for welding by spray transfer from a consumable electrode to a workpiece, comprising: a power supply for supplying an arc-maintaining current to a circuit completed by the workpiece and the consumable electrode; means for supplying pulses of current to cyclically enhance the arc current to a level above the minimum value required for spray transfer, thereby increasing the difference between maximum and minimum current levels; adjustable means for varying the amplitude of the current pulses over a predetermined range; and adjustable means for varying the pulse duration of the current pulses over a predetermined range, whereby different degrees of penetration of said workpiece can be obtained by adjustment of the pulse amplitude and pulse duration together.

2. Apparatus in accordance with claim 1, in which the means for cyclically enhancing the current includes a three-phase full wave rectifier power supply and in which the means for varying the pulse duration includes switching devices for selecting the number of successive, overlapping, rectified half-wave components to be included within a pulse.

3. Arc welding apparatus for welding by spray transfer from a consumable electrode to a workpiece, comprising: a power supply for supplying an arc-maintaining current to a circuit completed by the workpiece and the consumable electrode; pulse generating means for cyclically enhancing the arc current to provide a maximum level above the minimum level required for spray transfer, the current pulses having a leading edge and a trailing edge joined by a wave crest, the leading edge being steeper than a sinusoidal half wave of the same duration as the pulse and the crest being flatter than the said sinusoidal half wave; and adjustable means for varying simultaneously the amplitude of the pulsed current and its pulse duration in such a manner that the product of duration and the $n^{th}$ power of the current is approximately constant during such variation, the value of $n$ lying betwen 1.5 and 2.5.

4. Arc welding apparatus in accordance with claim 2, in which the means for cyclically enhancing the arc current includes a three-phase full wave rectified supply, each phase including in each of its half wave output connections a controlled rectifier, and in which the adjustable means for varying the pulse duration includes means for applying pulses in succession to the gating electrodes of the controlled rectifiers in successively operating phase connections of the power supply until pulse termination is required, the pulse duration varying with the number of controlled rectifiers to which successive switching signals are applied.

5. Arc welding apparatus in accordance with claim 1, in which the means for cyclically enhancing the current and the amplitude-adjusting and duration-adjusting means are such that the waveform of the cyclic enhancement is of substantially square shape, is adjustable over a range of amplitudes which is contained within the range 100 to 600 amps, and is adjustable over a range of durations which has an upper limit of at least 10 milliseconds and which is contained within the range 3 to 50 milliseconds, said apparatus further comprising means coupling the amplitude adjusting means and the duration adjusting means so that modification of the setting of one of said two adjusting means results in modification of the setting of the other of said two adjusting means approximately in accordance with the relationship $$I^n = B/t$$

in which I is the amplitude of the current pulse, $t$ the pulse duration and B a coefficient depending on the material of the consumable electrode and the size of the drop to be detached.

6. Arc welding apparatus in accordance with claim 1, including means for varying the pulse repetition frequency.

References Cited

UNITED STATES PATENTS

| | | | |
|---|---|---|---|
| 3,249,735 | 5/1966 | Needham | 219—131 |
| 3,339,107 | 8/1967 | Aldenhoff | 219—131 |

JOSEPH V. TRUHE, Primary Examiner

G. A. MONTANYE, Assistant Examiner

U.S. Cl. X.R.

219—137